United States Patent [19]

Demlehner et al.

[11] Patent Number: 5,039,724
[45] Date of Patent: Aug. 13, 1991

[54] PROCESS FOR PREPARING AQUEOUS EMULSIONS OF HIGH-MOLECULAR-WEIGHT ORGANOPOLYSILOXANES

[75] Inventors: Ulrich Demlehner, Kastl; Bernward Deubzer; Hans Mayer, both of Burghausen; Erich Pilzweger, Fulbach, all of Fed. Rep. of Germany

[73] Assignee: Wacker-Chemie GmbH, Munich, Fed. Rep. of Germany

[21] Appl. No.: 425,094

[22] Filed: Oct. 23, 1989

[30] Foreign Application Priority Data

Oct. 28, 1988 [DE] Fed. Rep. of Germany ....... 3836830

[51] Int. Cl.$^5$ .............................................. C08K 5/54
[52] U.S. Cl. .................... 524/267; 524/588; 524/837; 524/860
[58] Field of Search ............... 524/267, 588, 730, 837, 524/860

[56] References Cited

U.S. PATENT DOCUMENTS

| 2,842,521 | 7/1958 | Nitzsche et al. | 260/46.5 |
| 3,668,180 | 6/1972 | Brennan et al. | 260/46.5 |
| 3,792,071 | 2/1974 | Nitzsche et al. | 260/448.2 |
| 4,298,753 | 11/1981 | Shinabeck et al. | 556/415 |
| 4,552,910 | 11/1985 | Deubzer et al. | 524/43 |
| 4,559,385 | 12/1985 | Huhn et al. | 524/588 |
| 4,582,874 | 4/1986 | Grape et al. | 524/588 |

Primary Examiner—Melvyn I. Marquis

[57] ABSTRACT

A process for preparing aqueous emulsions from high-molecular-weight organopolysiloxanes which are solid at room temperature, in the absence of organic solvents, which comprises dissolving the high-molecular-weight organopolysiloxane which is solid at room temperature in a low-molecular-weight organo(poly)siloxane which is liquid at room temperature, and emulsifying this solution with water in the presence of an emulsifier and other additives, if desired.

18 Claims, No Drawings

PROCESS FOR PREPARING AQUEOUS EMULSIONS OF HIGH-MOLECULAR-WEIGHT ORGANOPOLYSILOXANES

The present invention relates to aqueous organopolysiloxane emulsions and more particularly to a process for preparing aqueous emulsions of high-molecular-weight organopolysiloxanes which are solid at room temperature, without using organic solvents.

BACKGROUND OF THE INVENTION

Environmental protection measures increasingly require the avoidance of organic solvents in chemical preparations. Accordingly, aqueous systems are increasingly being employed. In addition, organic solvents are often undesired due to their toxicological properties and their danger of fire.

The preparation of aqueous emulsions of organopolysiloxanes is widely known per se. In EP-A 157,323 (published Oct. 5, 1985, W. Grape et al, Bayer AG), in US-A 4,582,874 (published Apr. 15, 1986, W. Grape et al, Bayer AG), in GB-B 2,085,903 (published June 19, 1985, F. Traver, General Electric Co.) and in U.S. Pat. No. 4,552,910-A to Deubzer et al, aqueous emulsions of organopolysiloxanes are described where the organopolysiloxane, in the liquid state or dissolved in an organic solvent, is emulsified in water with addition of suitable emulsifiers. However, certain problems are encountered when aqueous emulsions are prepared from high-molecular-weight organopolysiloxanes, which are frequently produced in crystalline or at least glassy form, in the absence of organic solvents. In this case, the emulsification step can no longer be carried out using the customary equipment conforming to the state of the art, such as, for example, stand-mounted dissolvers, Turrax units, etc. Canadian Patent 1,205,937 to Traver, describes the preparation of aqueous emulsions of organopolysiloxane resins. The emulsification step is carried out by grinding in a colloid mill, which means that the aqueous system thus obtained must, strictly speaking, be regarded as an organopolysiloxane resin suspension.

Therefore, it is an object of the present invention to provide a process for preparing storage-stable aqueous emulsions from high-molecular-weight organopolysiloxanes which are solid at room temperature without using organic solvents. A further object of the present invention is to provide a process for preparing aqueous emulsions from high-molecular-weight organopolysiloxanes in which the proportion of the individual components and additives can be varied broadly in the emulsions.

SUMMARY OF THE INVENTION

The foregoing objects and others which will become apparent from the following description are accomplished in accordance with this invention, generally speaking, by providing a process for preparing aqueous emulsions from high-molecular-weight organopolysiloxanes which are solid at room temperature, which comprises dissolving the high-molecular-weight organopolysiloxane which is solid at room temperature in a low-molecular-weight organo(poly)siloxane which is liquid at room temperature, and emulsifying the resultant solution with water and an emulsifier and, if appropriate, other additives.

DESCRIPTION OF THE INVENTION

In the process of this invention, the high-molecular-weight organopolysiloxane which is solid at room temperature preferably has units of the general formula

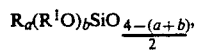

where R represents the same or different monovalent hydrocarbon radicals having from 1 to 14 carbon atoms per radical which can have substituents which are inert to water, $R^1$ represents the same or different alkyl radicals having from 1 to 4 carbon atoms per radical or hydrogen, a is 0, 1, 2 or 3 preferably an average of from 0.75 to 1.5 and more preferably an average of from 0.9 to 1.1, and b is 0, 1, 2, or 3, preferably an average of from 0.0 to 1.1, and more preferably an average of from 0.01 to 0.07, with the proviso that these organopolysiloxanes preferably have a molecular weight of at least 4,000 g/mol. The high-molecular-weight organopolysiloxane employed in the process of this invention can be a single type of high-molecular-weight organopolysiloxane or it can be a mixture of at least two different types of such high-molecular-weight organopolysiloxanes.

Examples of radicals represented by R are alkyl radicals, such as methyl, ethyl and propyl radicals, alkenyl radicals, such as the vinyl radical, and aryl radicals, such as the phenyl radical.

An example of a substituted hydrocarbon radical represented by R is the 3,3,3-trifluoropropyl radical.

Preferred radicals represented by R are methyl, propyl and phenyl radicals.

Examples of radicals represented by $R^1$ are methyl, ethyl and propyl radicals, with the ethyl radical being the preferred radical.

The preparation of the high-molecular-weight organopolysiloxanes which are solid at room temperature and are employed according to this invention is known and described, for example, in British Patent No. 685,173 to Dow Corning Limited; U.S. Pat. No. 2,842,521 to Nitzsche et al; French Patent No. 1,475,709 to General Electric Company; U.S. Pat. No. 3,668,180 to Brennan et al; U.S. Pat. No. 3,792,071 to Nitzsche et al; U.S. Pat. No. 3,846,358 to Roedel; and U.S. Pat. No. 4,298,753 to Schinabeck et al.

In the process of this invention, the high-molecular-weight organopolysiloxane employed is preferably one having the formula $CH_3SiO_{1.97}(OC_2H_5)_{0.06}$ and with a molecular weight of at least 4,000 g/mol.

The low-molecular-weight organo(poly)siloxanes employed according to this invention are preferably those comprising units of the general formula

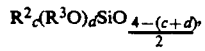

where $R^2$ represents the same or different monovalent hydrocarbon radicals having from 1 to 14 carbon atoms per radical which can have substituents which are inert to water, $R^3$ represents the same or different alkyl radicals having from 1 to 4 carbon atoms per radical or hydrogen atoms, c is 0, 1, 2 or 3, preferably an average of from 0.0 to 3.9, and more preferably an average of from 0.9 to 1.1, and d is 0, 1, 2 or 3, preferably an average of from 0.2 to 3.9, and more preferably an average of from 0.8 to 1.5, with the proviso that these organo(poly)siloxanes preferably have from 1 to 20 Si atoms per molecule and a viscosity of from 0.5 to 100 mPa.s at 25° C., and more preferably a viscosity of from 2 to 20 mPa.s at 25° C.

Examples of radicals represented by $R^2$ are alkyl radicals, such as the methyl and ethyl radicals, with the methyl radical being the preferred radical.

An example of a substituted hydrocarbon radical represented by $R^2$ is the 3,3,3-trifluoropropyl radical.

Examples of radicals represented by $R^3$ are methyl and ethyl radicals, with the ethyl radical being the preferred radical.

The low-molecular-weight organo(poly)siloxanes employed according to this invention can be prepared in the same manner as the high-molecular-weight organopolysiloxanes described above.

In the process of this invention, the low-molecular-weight organo(poly)siloxanes preferably have the formula $CH_3SiO_{1.1}(OC_2H_5)_{0.8}$ and have a viscosity of 20 mPa.s at 25° C.

The aqueous emulsions, prepared by the process of this invention, containing high-molecular-weight organopolysiloxanes preferably contain low-molecular-weight organo(poly)siloxanes in amounts of from 1 to 200 percent by weight, preferably from 20 to 50 percent by weight, and more preferably from 35 to 45 percent by weight, based on the total weight of the high-molecular-weight organopolysiloxane employed.

Emulsifiers which can be employed in the process of this invention are all ionic and non-ionic emulsifiers known heretofore, in which individual and mixtures of different emulsifiers, may be employed which have been or could have been used heretofore to prepare stable aqueous emulsions of organopolysiloxanes. It is also possible to employ emulsifiers such as described in DE-C 3,613,384 or in the corresponding U.S. patent application having Ser. No. 19,988 filed Feb. 27, 1987, and now U.S. Pat. No. 4,757,106. Nonionic emulsifiers are preferably employed. Particularly preferred are emulsifiers based on polyethylene glycol, such as isotridecyl alcohol polyethlyene oxide ether containing an average of 16 ethylene oxide units.

The aqueous emulsions, prepared by the process of this invention from high-molecular-weight organopolysiloxanes contain an emulsifier in an amount of preferably from 0.1 to 50 percent by weight, based on the total weight of the high-molecular-weight organopolysiloxane and low-molecular-weight organo(poly)siloxane employed.

The aqueous emulsions of this invention containing high-molecular-weight organopolysiloxanes which are solid at room temperature are prepared by first dissolving the high-molecular-weight organopolysiloxane which is solid at room temperature in the liquid low-molecular-weight organo(poly)siloxane, and emulsifying this solution with water in the presence of an emulsifier. In this process, the emulsifier, depending on its chemical state, can be introduced into the water phase or into the oil phase. The dissolution of the high-molecular-weight organopolysiloxane in the low-molecular-weight organo(poly)siloxane and the emulsification step can be carried out in standard mixers which are suitable for the preparation of emulsions, such as high-speed stator-rotor stirrers such as designed by Prof. P. Willems, which are known under the registered trade mark "UltraTurrax". After the emulsification step, the emulsion can be diluted as desired with water.

The aqueous emulsions, prepared by the process of this invention from high-molecular-weight organopolysiloxanes have a solids content of preferably from 1 to 80 percent by weight, preferably from 30 to 60 percent by weight and more preferably from 45 to 55 percent by weight, based on the total weight of the emulsion.

In addition, additives selected from the group comprising catalysts, such as, preferably metal salts, thixotropic agents, pigments, acids or bases and preservatives may be added, if desired. The amount added depends on the particular application of the emulsion and on the necessary properties. The mode of addition of the additives can be varied and depends on their chemical properties. Thus, for example, water-soluble substances can be added to the water phase and water-insoluble substances to the oil phase. In addition, additives can also be added to the emulsion which has already been formed, but the additives must not interfere with the formed emulsion.

The emulsions, if prepared by the process of this invention from high-molecular-weight organopolysiloxanes which are solid at room temperature have a surprisingly long shelf life of more than six months at room temperature, although, as known to those skilled in the art, aqueous emulsions of low-molecular-weight organo(poly)siloxanes tend to precipitate due to very short shelf lives, i.e., within a few days.

The process of this invention is suitable for preparing any solvent-free emulsions from high-molecular-weight organopolysiloxanes which are solid at room temperature, which can be employed for a wide variety of applications, in particular where the absence of organic solvents is necessary. Aqueous emulsions of this type are particularly suitable, for example, as binders for emulsion paints, as primers on mineral substrates, as additives to organic dispersions, as water-repellent agents and as binders for fiber materials, etc., in which the addition of various additives is possible or necessary depending on the application.

In the following examples, all parts and percentages are by weight, unless otherwise specified.

In the chemical formulas, the following abbreviations are used:
Me:—$CH_3$
Et:—$C_2H_5$

EXAMPLE 1

About 70 parts of an organopolysiloxane of the empirical formula $MeSiO_{1.48}(OEt)_{0.04}$     (siloxane A)

(commercially available under the name "Festharz MK" from Wacker-Chemie GmbH, Munich) which is solid at room temperature are dissolved in 30 parts of an organo(poly)siloxane of the empirical formula $MeSiO_{1.1}(OEt)_{0.8}$     (siloxane B)

having a viscosity of 25 mPa.s at 25° C. (available under the name "Trasil" from Wacker-Chemie GmbH, Munich) with the aid of ultrasound irradiation. The resulting mixture has a viscosity of about 180 Pa.s at 25° C.

About 9 parts of a non-ionic emulsifier based on polyethylene glycol (isotridecyl alcohol polyethylene oxide ether containing an average of 16 polyethylene oxide units) which is available under the trade name "Arlypon IT 16" from Grünau, Illertissen are added to 150 g of this organopolysiloxane solution and the mixture stirred. The mixture is then emulsified with the aid of an emulsification unit, such as, for example, an "Ultra-Turrax" by adding 141 parts of demineralized water with constant stirring. An aqueous emulsion of high-molecular-weight organopolysiloxane having a solids content of 51 percent by weight, based on the total weight of the emulsion, is obtained.

The resultant emulsion exhibits no sedimentation on centrifuging for one hour (speed: 4,000 rpm). It is stable for more than six months at room temperature.

EXAMPLE 2

The procedure described in Example (1) is repeated, except that 60 parts of a 10 percent aqueous solution of a polyvinyl alcohol having the trade name "Polyviol W 25/140", available from Wacker-Chemie GmbH, Munich, is used as emulsifier and the emulsification is carried out using 90 parts of demineralized water. An aqueous emulsion of high-molecular-weight organopolysiloxane having a solids content of 52 percent by weight, based on the total weight of the emulsion, is obtained.

The resultant emulsion exhibits no sedimentation on centrifuging for one hour (speed: 4,000 rpm). It is stable for longer than six months at room temperature.

EXAMPLE 3

The procedure described in Example (1) is repeated, except that the high-molecular-weight organopolysiloxane which is solid at room temperature (siloxane A) and the organo(poly)siloxane which is liquid at room temperature (siloxane B) are employed in a weight ratio of 1:1. An aqueous emulsion of high-molecular-weight organopolysiloxane having a solids content of 52 percent by weight, based on the total weight of the emulsion, is obtained.

The resultant emulsion exhibits no sedimentation on centrifuging for one hour (speed: 4,000 rpm). It is stable for longer than six months at room temperature.

EXAMPLE 4

The emulsifier used is an ionic emulsifier, which is prepared as follows:

About 150 parts of N-(2-aminoethyl)-3-aminopropyl-trimethoxysilane (available under the trade name "Silan GF 91" from Wacker-Chemie GmbH, Munich) are added to a stirred mixture containing 0.2 parts of KOH in 4 parts of methanol and 500 parts of siloxane (B) described in Example (1) in a 1 liter three-neck flask fitted with stirrer, dropping funnel and reflux condenser. The mixture is refluxed for six hours, then cooled to 30° C., mixed with 2.5 ml of 10 percent aqueous hydrochloric acid, freed from volatile components by warming to 140° C. and filtered. About 53.3 parts of the siloxane obtained in this way are mixed with 6.7 parts of glacial acetic acid.

About 45 parts of the siloxane/glacial acetic acid mixture described above are added to 105 parts of the siloxane mixture having a viscosity of about 180 Pa.s at 25° C., described in Example (1). This mixture is then emulsified using the procedure described in Example (1) with a total of 150 parts of demineralized water. An aqueous emulsion of high-molecular-weight organopolysiloxane having a solids content of 49 percent by weight, based on the total weight of emulsion, is obtained.

The resultant emulsion exhibits no sedimentation on centrifuging for one hour (speed: 4,000 rpm). It is stable for longer than six months at room temperature.

EXAMPLE 5

The procedure described in Example (4) is repeated, except that the siloxane mixture having a viscosity of about 180 Pa.s described in Example (1) is replaced by a mixture prepared by dissolving 70 parts of the high-molecular-weight organopolysiloxane which is solid at room temperature (siloxane A) from Example (1) in 30 parts of an organo(poly)siloxane of the empirical formula $MeSiO_{1.1}(OMe)_{0.8}$ (siloxane C) available under the trade name "VP 2265" from Wacker-Chemie GmbH, Munich). An aqueous emulsion of high-molecular-weight organopolysiloxane having a solids content of 50 percent by weight, based on the total weight of emulsion, is obtained.

The resultant emulsion exhibits no sedimentation on centrifuging for one hour (speed: 4,000 rpm). It is stable for longer than six months at room temperature.

EXAMPLE 6

The procedure described in Example (1) is repeated, except that the organo(poly)siloxane used in Example (1) is replaced by an organo(poly)siloxane of the empirical formula $SiO_{0.85}(OEt)_{2.3}$ (siloxane D) having a viscosity of 4 mPa.s at 25° C. (available under the trade name "Silikat TES 40" from Wacker-Chemie GmbH, Munich). An aqueous emulsion of high-molecular-weight organopolysiloxane having a solids content of 51 percent by weight, based on the total weight of emulsion, is obtained.

The resultant emulsion exhibits no sedimentation on centrifuging for one hour (speed: 4,000 rpm). It is stable for longer than six months at room temperature.

EXAMPLE 7

About 70 parts of the organopolysiloxane which is solid at room temperature and is described in Example (1) (siloxane A) are dissolved in 30 parts of a silane of the empirical formula $MeSi(OEt)_3$ (silane E)

having a viscosity of 0.6 mPa.s at 25° C. (available under the trade name "Silan Ml-Triethoxy" from Wacker-Chemie GmbH, Munich). Ultrasound irradiation or a suitable mixer can be used for dissolution.

About 60 parts of a 10 percent aqueous solution of a polyvinyl alcohol (trade name "Polyviol W 25/140" available from Wacker-Chemie GmbH, Munich) are dispersed in 150 parts of this organopolysiloxane solution. The mixture is emulsified with the aid of an emulsification unit, such as, for example, an "Ultra-Turrax" by adding 90 parts of demineralized water with constant stirring. An aqueous emulsion of high-molecular-weight organopolysiloxane having a solids content of 52 percent by weight, based on the total weight of emulsion, is obtained.

The emulsion prepared exhibits no sedimentation on centrifuging for one hour (speed: 4,000 rpm). It is stable for at least three months at room temperature.

What is claimed is:

1. A process for preparing an aqueous emulsion from a high-molecular-weight organopolysiloxane which is solid at room temperature, which comprises dissolving the high-molecular-weight organopolysiloxane which is solid at room temperature in a low-molecular-weight organo(poly)siloxane which is liquid at room temperature, and thereafter emulsifying the solution with water and an emulsifier.

2. The process of claim 1, wherein the high-molecular-weight organopolysiloxane has units of the formula $$R_a(R^1O)_bSiO_{\frac{4-(a+b)}{2}},$$

where R is selected from the group consisting of monovalent hydrocarbon radicals having from 1 to 14 carbon atoms per radical and substituted monovalent hydrocarbon atoms having from 1 to 14 carbon atoms per radical in which the substituents are inert to water, $R^1$ is selected from the group consisting of a hydrogen atom and an alkyl radical having from 1 to 4 carbon atoms per radical, a is 0, 1, 2 or 3, with an average of from 0.75 to 1.5, and b is 0, 1, 2 or 3, with an average of from 0.0 to 1.1, with the proviso that the organopolysiloxane has a molecular weight of at least 4,000 g/mol.

3. The process of claim 1, wherein the low-molecular-weight organo(poly)siloxane has units of the formula $$R^2_c(R^3O)_dSiO_{\frac{4-(c+d)}{2}},$$

where $R^2$ is selected from the group consisting of monovalent hydrocarbon radicals having from 1 to 14 carbon atoms per radical and substituted monovalent hydrocarbon radicals having from 1 to 14 carbon atoms per radical, in which the substituents are inert to water, $R^3$ is selected from the group consisting of a hydrogen atom and an alkyl radical having from 1 to 4 carbon atoms per radical, c is 0, 1, 2 or 3, with an average of from 0.0 to 3.9, and d is 0, 1, 2 or 3, with an average of from 0.2 to 3.9, with the proviso that the organo(poly)siloxane contains from 1 to 20 Si atoms per molecule and has a viscosity of from 0.5 to 100 mPa.s at 25° C.

4. The process of claim 1, wherein the low-molecular-weight organo(poly)siloxane is employed in an amount of from 1 to 200 percent by weight, based on the total weight of the high-molecular-weight organopolysiloxane.

5. The process of claim 2, wherein the low-molecular-weight organo(poly)siloxane is employed in an amount of from 1 to 200 percent by weight, based on the total weight of the high-molecular-weight organopolysiloxane.

6. The process of claim 3, wherein the low-molecular-weight organo(poly)siloxane is employed in an amount of from 1 to 200 percent by weight, based on the total weight of the high-molecular-weight organopolysiloxane.

7. The process of claim 1, wherein the emulsifier is employed in an amount of from 0.1 to 50 percent by weight, based on the total weight of the high-molecular-weight organopolysiloxane and low-molecular-weight organo(poly)siloxane.

8. The process of claim 2, wherein the emulsifier is employed in an amount of from 0.1 to 50 percent by weight, based on the total weight of the high-molecular-weight organopolysiloxane and low-molecular-weight organo(poly)siloxane.

9. The process of claim 3, wherein the emulsifier is employed in an amount of from 0.1 to 50 percent by weight, based on the total weight of the high-molecular-weight organopolysiloxane and low-molecular-weight organo(poly)siloxane.

10. The process of claim 1, wherein the aqueous emulsion has a solids content of from 1 to 80 percent by weight, based on the total weight of the emulsion.

11. The process of claim 2, wherein the aqueous emulsion has a solids content of from 1 to 80 percent by weight, based on the total weight of the emulsion.

12. The process of claim 3, wherein the aqueous emulsion has a solids content of from 1 to 80 percent by weight, based on the total weight of the emulsion.

13. The process of claim 1, wherein an additive selected from the group consisting of catalysts, thixotropic agents, pigments, acids or bases, preservatives and mixtures thereof is added to the emulsion.

14. The process of claim 2, wherein an additive selected from the group consisting of catalysts, thixotropic agents, pigments, acids or bases, preservatives and mixtures thereof is added to the emulsion.

15. The process of claim 3, wherein an additive selected from the group consisting of catalysts, thixotropic agents, pigments, acids or bases, preservatives and mixtures thereof is added to the emulsion.

16. The process of claim 4, wherein an additive selected from the group consisting of catalysts, thixotropic agents, pigments, acids or bases, preservatives and mixtures thereof is added to the emulsion.

17. The process of claim 7, wherein an additive selected from the group consisting of catalysts, thixotropic agents, pigments, acids or bases, preservatives and mixtures thereof is added to the emulsion.

18. The process of claim 10, wherein an additive selected from the group consisting of catalysts, thixotropic agents, pigments, acids or bases, preservatives and mixtures thereof is added to the emulsion.

* * * * *